United States Patent [19]
Boichot et al.

[11] Patent Number: 5,862,894
[45] Date of Patent: Jan. 26, 1999

[54] SEMI-ACTIVE DAMPER WITH CONTINUOUS FORCE CONTROL

[75] Inventors: Philippe Boichot; Régis Kirat, both of Le Creusot, France

[73] Assignee: GEC Alsthom Transport SA, Paris, France

[21] Appl. No.: 885,947

[22] Filed: Jun. 30, 1997

[30] Foreign Application Priority Data

Jul. 5, 1996 [FR] France ................................. 98 08406

[51] Int. Cl.⁶ ........................................................ F16F 9/49
[52] U.S. Cl. ............................ 188/280; 267/136; 280/707
[58] Field of Search ............................... 188/299.1, 314, 188/318, 280, 281, 285; 267/136; 280/707, 714

[56] References Cited

FOREIGN PATENT DOCUMENTS

| 0691226A1 | 1/1996 | European Pat. Off. . |
|---|---|---|
| 2660705 | 4/1993 | France . |
| 4202091A1 | 8/1992 | Germany . |
| WO9106439 | 5/1991 | WIPO . |

*Primary Examiner*—Lee W. Young
*Attorney, Agent, or Firm*—Sughrue, Mion, Zinn, Macpeak & Seas, PLLC

[57] ABSTRACT

A semi-active damper is controlled by a control circuit which includes a direct main feedback loop, as well as a secondary force feedback loop. The direct main feedback loop includes an inverse model of the damper to be controlled. In the inverse model, an equivalent speed $\dot{y}_e$ is determined, for use in controlling the damper, based on the measured relative speed $\dot{y}$ of the ends of the damper. The equivalent speed $\dot{y}_e$ is used for the purpose of compensating for the fact that a hydraulic fluid used in the damper is not an absolutely incompressible fluid.

13 Claims, 3 Drawing Sheets

SEMI-ACTIVE DAMPER WITH CONTINUOUS FORCE CONTROL

The present invention relates to damper control circuits comprising a direct control loop including an inverse model of the damper, in general, and it relates more particularly to a semi-active damper with continuous force controlling.

BACKGROUND OF THE INVENTION

The Applicants' French patent application FR 94 08 337 discloses the general principle of tracking a force by an inverse model using an open loop scheme.

In accordance with the essential characteristics of the semi-active damper controlled by a control circuit as described in that French patent application FR 94 08 337, the control circuit includes a direct control loop including an inverse model of the damper.

In addition, the inverse model of the damper determines a value for an ideal electric current $i_{th}$ for controlling a compression controlled-restriction valve and an expansion controlled-restriction valve on the basis of a measured value for a relative speed $\dot{y}$ between two ends of the damper, and on the basis of a force reference value Fc.

A force feedback loop adds to the ideal control electric current $i_{th}$ a proportional type corrective term $\delta i$ so as to take into account a force error $\epsilon F$ between the reference force value Fc and the measured value of the force F actually exerted.

The inverse model of the damper is defined by the expressions:

$$i_{th} = K_{23} \frac{|\dot{y}|}{\sqrt{|Fc|}} \text{ in expansion } (\dot{y} > 0),$$

and $$i_{th} = K_{13} \frac{|\dot{y}|}{\sqrt{|Fc|}} \text{ in compresison } (\dot{y} > 0)$$

where $K_{13}$ and $K_{23}$ are positive constants that depend on the size of the actuator, on the physical characteristics of the oil, and also on the flow rate gain of the hydraulic valves.

The inverse model of the damper as defined in this way assumes that the fluid is incompressible.

Nevertheless, this assumption is not valid in all applications.

OBJECTS AND SUMMARY OF THE INVENTION

Thus, an object of the invention is to provide apparatus for continuously controlling the force of a semi-active damper while making it possible to be unaffected by the problem of fluid compressibility.

According to the invention, in the semi-active damper controlled by a control circuit, the control circuit includes a direct main control loop composed of an inverse model of the damper, said inverse model being based on physical magnitudes and being such as to enable the control magnitude to be determined as a function of the drive applied to the semi-active damper and of the reference force to be achieved.

The control loop is said to be "direct" because it does not require force sensors to be used.

An advantage of the semi-active damper of the invention characterized in this way is that it takes account of the compressibility of the fluid via the computation of equivalent speeds $\dot{y}_e$.

The semi-active damper of the invention also satisfies at least one of the following characteristics:

said inverse model of the damper determines an ideal value for a control electric current $i_{th}$ for controlling a compression controlled-restriction valve and an expansion controlled-restriction valve, or a single valve combining both functions, on the basis of a measured value for the relative speed $\dot{y}$ between two ends of the damper and of a force reference value Fc, equivalent speeds $\dot{y}_e$ being deduced from said relative speed $\dot{y}$;

said inverse model of the damper comprises:
  a first block for estimating the headloss $\Delta P_{CL}$ of the open non-return valve, namely: the expansion non-return valve in expansion and the compression non-return valve in compression;
  a second block for estimating the headloss $\Delta P_v$ of the active controlled-restriction valve;
  a third block for computing the ideal control current $i_{th}$ for the controlled-restriction valve;
  a fourth block for computing the corrective term $\delta \dot{y}$ for the speed $\dot{y}$; and
  a summing circuit;

said first block computes the headloss $\Delta P_{CL}$ in the open non-return valve;

said magnitude $\Delta P_{CL}$ output from said first block is interpolated from an array of characteristics tabulated as a function of the input magnitudes $\dot{y}$ and $i_{th}$ of said first block;

said second block estimates the headloss $\Delta P_v$ to be achieved by the active controlled-restriction valve placed between the chamber under pressure and the accumulator;

the output $\Delta P_v$ from the block is computed as a function of the two inputs to the block, Fc and $\Delta P_{CL}$:
$\Delta P_v = [Fc - \Delta P_{CL} \cdot S2]/S1$ in expansion
$\Delta P_v = [-Fc - \Delta P_{CL} \cdot S1]/S2$ in compression;

the measured speed information $\dot{y}$ is corrected by the output $\delta \dot{y}$ from said fourth block to form at the output from said summing circuit, an equivalent speed $\dot{y}_e = \dot{y} + \delta \dot{y}$;

said fourth block calculates the corrective speed term $\delta \dot{y}$;

said corrective speed term $\delta \dot{y}$ is given by the expression:

$$\delta \dot{y} = \epsilon(\dot{y}) r(\dot{y}) \frac{d\Delta P_v}{dt}$$

said third block computes the ideal control current $i_{th}$ as a function of the two inputs $\Delta P_v$ and $\dot{y}_e$ of said third block;

said controlled-restriction valves are previously characterized by identifying a non-linear gain K(i) relating the measured headloss $\Delta P_{Vmeasured}$ of the valve, the equivalent speed $\dot{y}_e$ built up from the measured values $\Delta P_v$ and $\dot{y}$, and the current i, of the form:

$$K(i) = \frac{\Delta P_{Vmeasured}}{|\dot{y}_{emeasured}| \dot{y}_{emeasured}}$$

the current $i_{th}$ is determined by minimizing the error function $\epsilon K(i)$ over the set of acceptable currents, i.e. $i_{th}$ such that:

$$\epsilon K(i_{th}) = \min_i[\epsilon K(i)] = \min_i \left[ \left| K(i) - \frac{\Delta P_v}{|\dot{y}_e|\dot{y}_e} \right| \right]$$

in which expression:

K(i) is the non-linear gain identified from the measurements;

$\Delta P_v$ is the headloss to be achieved, as computed at the output from the second block; and $\dot{y}_e$ is the equivalent speed computed at the output of the summing circuit; and a secondary force feedback loop introduces a minor corrective term into said main ideal electric control current $i_{th}$, which minor term δi is of the proportional type, thereby taking account of a force error εF between the reference force Fc and a measured value of the force F actually exerted.

Another advantage of the continuous force controlling apparatus for a semi-active damper of the invention is that of tracking a dissipative reference force, i.e. of continuously implementing an infinity of relationships between force and relative speed, unlike prior art controlled dampers in which the controlling systems can perform only a limited number of characteristics.

Another advantage of the continuous force controlling apparatus for a semi-active damper of the invention is that it makes it possible to use standard, low-range hydraulic components, assuming that the damper is hydraulic.

Another advantage of the continuous force controlling apparatus for a semi-active damper of the invention is that it enables the system to operate in satisfactory manner with its instrumentation being reduced to a single speed sensor.

For example, if a force sensor becomes degraded, then the corrective term δi is inoperative and set to zero, with the main contribution $i_{th}$ to the control current, based on the value of the reference force Fc and on the single measurement of stress applied to the damper, maintaining satisfactory precision.

Another advantage of the continuous force controlling apparatus for a semi-active damper of the invention is that it makes it possible, during dissipative stages of movement, to track a control relationship formulated in terms of force.

BRIEF DESCRIPTION OF THE DRAWINGS

Other aims, characteristics, and advantages of the invention appear on reading the following description of the preferred embodiment of continuous force controlling apparatus for a semi-active damper, which description is given with reference to the drawings, in which.

MORE DETAILED DESCRIPTION

Figure 1:
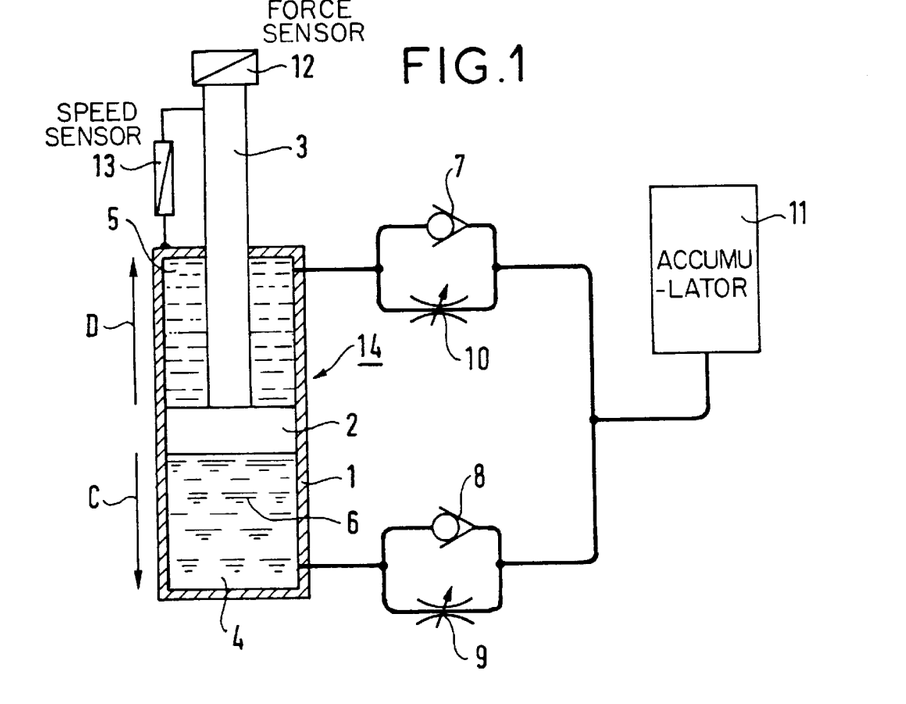
FIG. 1 is a theoretical diagram of a controlled semi-active damper in accordance with the invention of and as described in the Applicants' French patent application FR 94 08 337, published under the number 2 722 265.

FIG. 1 is a theoretical diagram of a controlled semi-active damper in accordance with the invention of and as described in the Applicants' French patent application FR 94 08 337, published under the number 2 722 265.

The controlled semi-active damper of the invention includes a body 1 in which there slides a solid piston 2 provided with a piston rod 3, such that the assembly constitutes an actuator 14.

The piston 2 defines a first chamber 4 referred to as a "compression" chamber, and a second chamber 5 referred to as an "expansion" chamber.

The body 1 is filled with a fluid 6, e.g. hydraulic oil.

The semi-active damper also includes a first non-return valve 7 referred to as a "compression" non-return valve, and a second non-return valve 8 referred to as an "expansion" non-return valve.

A first hydraulic controlled-restriction valve 9, referred to as a "compression" controlled-restriction valve, and a second controlled-restriction hydraulic valve 10 referred to as an "expansion" controlled-restriction valve are both controlled electrically.

The semi-active damper also includes an accumulator 11 that is preloaded to a small extent during assembly of the semi-active damper, and that is constituted by a chamber.

Such an accumulator, e.g. an oleopneumatic accumulator, constitutes a fixed volume containing an inert gas under pressure and hydraulic oil to which the gas communicates its pressure.

The two fluids are generally separated physically by a membrane or a balloon.

The function of the accumulator consists firstly in absorbing a volume of oil corresponding to the volume of the piston rod when the damper is fully compressed, and secondly in ensuring that a certain minimum amount of pressure obtains in the hydraulic circuit.

It is important to observe that the operation of the semi-active damper of the invention does not require any external source of hydraulic pressure such as a high pressure accumulator or a hydraulic pump.

The compression non-return valve 7 and the expansion controlled-restriction valve 10 are connected in parallel and are disposed between the expansion chamber 5 and the accumulator chamber 11.

The expansion non-return valve 8 and the compression controlled-restriction valve 9 are connected in parallel and are disposed between the compression chamber 4 and the accumulator chamber 11.

Finally, the semi-active damper includes a force sensor 12 and a relative speed sensor 13.

Figure 2:
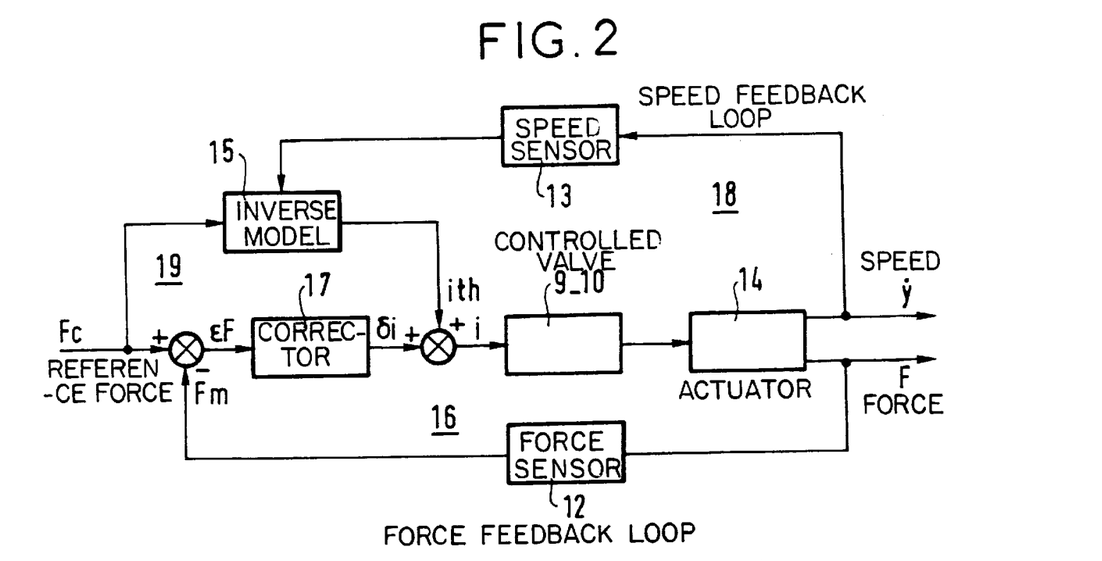
FIG. 2 is a block diagram of the control circuit for the controlled semi-active damper in accordance with the invention of and as described in the Applicants' French patent application FR 94 08 337.

FIG. 2 is a block diagram of the control means for the controlled semi-active damper in accordance with the invention of and as described in the Applicants' French patent application FR 94 08 337, published under the number 2 722 265.

The references used in FIG. 2 and their meanings are given below:

Fc: reference force

F: actual force

Fm: actual force F as measured by sensor eF: force error eF=Fc−Fm

ẏ: relative speed between the two ends of the damper i: electric current for controlling the controlled-restriction valves $i_{th}$: ideal control current as determined by the inverse model and for application to the hydraulic controlled-restriction valves to obtain the force Fc δi: an additional correction $i = i_{th} + \delta i$ for taking account of the force error $\epsilon F$ The hydraulic operation of the controlled semiactive damper of the invention is described below with reference to FIGS. 1 and 2.

Two stages can be distinguished in the hydraulic operation of the controlled semi-active damper of the invention:
- a first stage referred to as a "compression" stage symbolized in FIG. 1 by arrow C; and
- a second stage, referred to as an "expansion" stage, symbolized in FIG. 1 by arrow D.

During the compression stage, the piston 2 penetrates into the body 1 of the actuator, while during the expansion stage, the piston 2 moves outwardly relative to the body 1 of the actuator.

During the compression stage, the fluid 6 contained in the compression chamber 4 is compressed. The expansion non-return valve 8 is closed, thereby forcing the fluid to pass via the compression controlled-restriction valve 9.

The compression non-return valve 7 allows the fluid 6 to short circuit the expansion controlled-restriction valve 10 and to fill the expansion chamber 5 freely.

Control of the compression controlled-restriction valve 9 makes it possible to control the pressure level in the compression chamber 4, and thus to control the reaction force exerted in compression.

During the expansion stage, the members swap roles.

The expansion controlled-restriction valve 10 controls the passage of fluid 6 from the expansion chamber 5 to the accumulator chamber 11, thereby enabling the expansion force to be modulated.

The expansion non-return valve 8 is active and allows the fluid 6 to pass freely from the expansion chamber 5 to the accumulator chamber 11.

The compression and expansion controlled-restriction valves 9 and 10 are preferably controlled electrically so as to modulate the damping force which is always in opposition to the speed.

It results from the above that the damping remains a dissipative system.

The modulation of the force exerted enables said force to be servo-controlled to a reference force Fc generated by a computer (not shown).

The basic problem consists in determining the control current i to be applied to the compression and expansion controlled-restriction valves 9 and 10 in order to achieve the reference force Fc.

By using relationships representative of equilibrium in the volume flow rate for each chamber of the damper at constant speed, both for the compression stage and for the expansion stage, it is possible to deduce a simple relationship between the current $i_{th}$ delivered by an inverse model 15 of the damper, the instantaneous relative speed $\dot{y}$, and the damping force.

For example, in the expansion stage, this relationship is given by the following equation:

$$F = \frac{\rho}{2}\left(\frac{S_2}{Gi \times i}\right)^2 S_2 \dot{y}^2 + \frac{\rho}{2}\left(\frac{S_1}{Cd \times A_{31}(\Delta P_{31})}\right)^2 S_1 \dot{y}^2 - (P_3 - Pe)St$$

in which:
- F: is the damping force exerted
- ρ: is the density of the oil
- $S_1$: is the section area of the piston subjected to the pressure on the side without a piston rod
- $S_2$: is the section area of the piston subjected to the pressure on the side with a piston rod
- St: is the section area of the piston rod
- $\dot{y}$: is the relative speed
- Gi: is the pressure gain of the control valve
- i: is the control current
- Cd: is the flow rate coefficient of the expansion non-return valve
- $A_{31}$: is the geometrical flow section of the expansion non-return valve
- $\Delta P_{31}$: is the headloss between the accumulator and the chamber in suction
- $P_3$: is the pressure in the accumulator
- Pe: is atmospheric pressure Making use of this damper model, in the sense that a search is made for the current $i_{th}$ for application to the control members as a function of the desired force Fc and of the measured speed $\dot{y}$, amounts to making use of an inverse model 15 of the damper.

Because of simplifications in establishing the damping relationship, and thus in the inverse model 15 of the damping, a proportional type corrective term δi is included by means of the force feedback loop 16.

By using the force sensor 12 to provide the measurement Fm of the force F that is exerted, the feedback loop 16 makes it possible to generate an error signal $\epsilon F$ between the reference Fc and the measured force Fm.

This error signal $\epsilon F$ is applied to a corrector 17 which delivers the additional correction δi to the control current i for the controlled-restriction valves 9 and 10.

The value of the relative speed $\dot{y}$ is inserted into the inverse model 15 of the damper via a speed feedback loop 18.

The speed feedback loop 18 includes the speed sensor 13.

The value of the ideal control current $i_{th}$ is determined by the inverse model 15 of the damper.

The ideal control current $i_{th}$ is applied to the hydraulic controlled-restriction valves to obtain the force Fc via a direct control loop 19.

The direct control loop 19 includes the inverse model 15 of the damper which is defined, for example, by the following expressions:

$$i_{th} = K_{23}\frac{|\dot{y}|}{\sqrt{|Fc|}} \quad \text{in expansion } (\dot{y} > 0),$$

and $$i_{th} = K_{13}\frac{|\dot{y}|}{\sqrt{|Fc|}} \quad \text{in compresison } (\dot{y} > 0)$$

where $K_{13}$ and $K_{23}$ are positive constants that depend on the size of the actuator, on the physical characteristics of the oil, and also on the flow rate gain of the hydraulic controlled-restriction valves.

The semi-active damper of the invention is applicable as a transverse secondary suspension for a passenger rail vehicle.

The description below relates more particularly to a semi-active damper with continuous force control, of the present invention.

Figure 4:
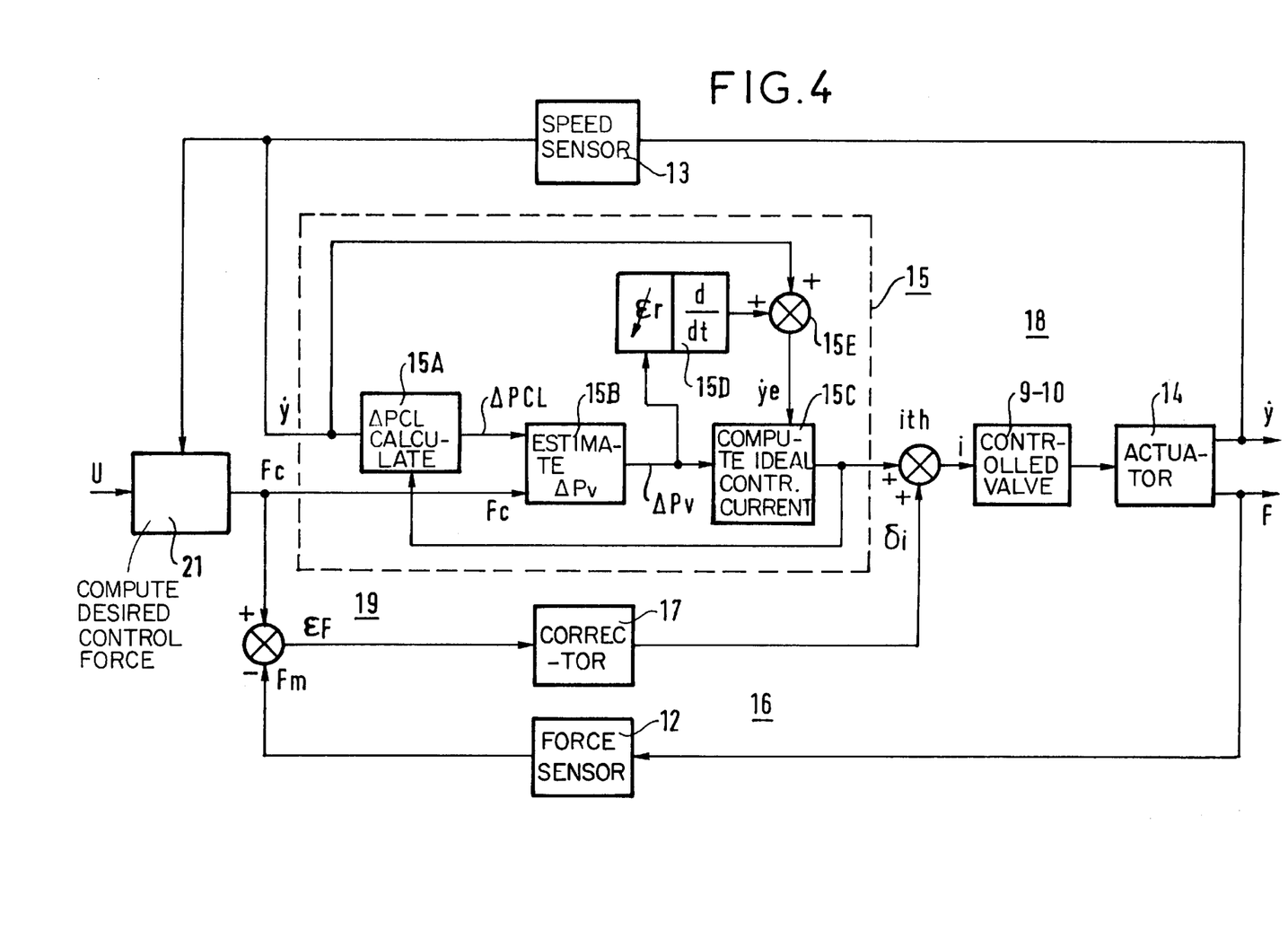
FIG. 4 is a block diagram of the control circuit for the controlled semi-active damper with continuous force controlling of the present invention.

FIG. 4 shows a preferred embodiment of the block diagram of the control circuit of the semi-active damper with continuous force control of the present invention.

The block diagram shown in FIG. 4 thus adds to the block diagram of the controlled semi-active damper as described in the Applicants' French patent application FR 94 08 337.

Elements that are common to FIGS. 2 and 4 carry the same references.

Figure 3:
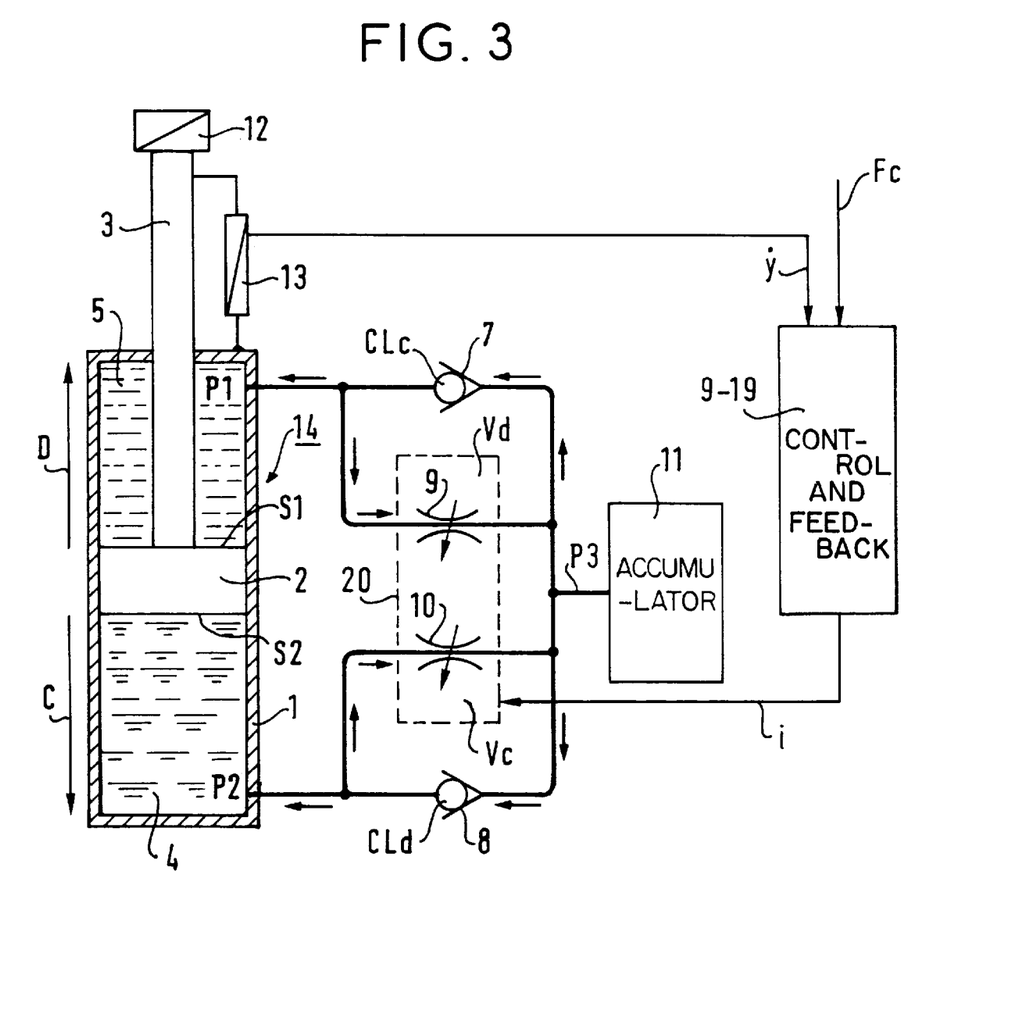
FIG. 3 is a theoretical diagram of the controlled semi-active damper of the present invention.

The corrector 17 and the force sensor 12 still appear in FIGS. 3 and 4 even though they are now optional and are therefore not used in practice.

A conventional damper delivers a dissipative hydraulic force Fv as a function of the speed at which it is stressed $\dot{y}$, without providing any possibility for external control.

With the controlled damper, the basic idea is to invert this cause-and-effect relationship, i.e. given knowledge of the speed $\dot{y}$ and of the reference force Fc, to determine the adjustment parameter (current value $i_{th}$ for controlling the valve) that enables Fv to be made to be equal to Fc.

Starting from an understanding of the physical behavior of the apparatus, it has been possible to implement a model of the system associating the speed $\dot{y}$, the reference force Fc, and the control current $i_{th}$, and then to develop an inverse model.

Equivalent speeds $\dot{y}_e$ have been deduced from the speed $\dot{y}$ instead of working on the basis of the speed $\dot{y}$ itself, thereby extending the control scheme to the present case of a system that includes a compressible fluid.

The description below relates to the open loop control scheme.

Conventional servo-control techniques based on an error signal ($\epsilon F=Fv-Fc$) are not effective in the present application and require the actual force Fv to be measured in the main loop.

An open loop scheme has been developed that makes it possible to determine the control current $i_{th}$ directly as a function of the desired force Fc and of the speed $\dot{y}$, without measuring the force.

The description below relates to a correction to be applied to the driving speed on the basis of an estimate of pressure dynamics, and introduces the notion of "equivalent" speed.

The compressibility of the fluid imposes force-speed characteristics Fv=fct($\dot{y}$, i) that exhibit hysteresis unsuitable for applying the principle of the inverse model as formulated for an incompressible fluid.

The speed data $\dot{y}$ has been corrected in the form of an equivalent speed $\dot{y}_e$ to be able to have an unambiguous description of the characteristics: Fv=fct($\dot{y}_e$, i) that makes it possible to use the concept of an inverse model.

Fluid compressibility has an effect in the equations concerning continuity of fluid volumes in the compression and expansion chambers 4 and 5 in the form of a compressibility flow rate associated with the derivative of the pressure.

The speed $\dot{y}$ has thus been corrected by a term proportional to the derivative of the pressure of the chamber under tension, in order to reduce to a formulation that is analogous to that obtained under the assumption that the fluid is incompressible.

Ignoring pressure variation in the accumulator, the working pressure in the chamber under tension is substantially equal to the desired headloss in the active through orifice of the controlled-restriction valve, $\Delta P_v$. This is given by the following expression:

$$\dot{y}_e = \dot{y} - \text{sign}(\dot{y})r(\dot{y})\frac{d\Delta P_v}{dt}$$

where $\dot{y}_e$ is the estimated equivalent speed replacing $\dot{y}$.

The description below relates to advancing the phase of the reference for the controlled-restriction valve.

The sign function relates to the driving stage where the coefficient r($\dot{y}$) is modelled as a function of the relative driving speed.

A positive value complies with the theoretical justification associated with taking account of the fluid being compressible.

A negative value advances the phase of the equivalent speed, which serves to limit the speed at which the controlled-restriction valve is closed at low speeds, and therefore avoids any hydraulic blockage.

The description below relates to shaping the reference force.

Starting from a control relationship U, derived from the theory of optimum control, for example, the reference force value is restricted to the dissipative domain imposed by the limiting physical characteristics of the damper both when low (controlled-restriction valve wide open) and when high (controlled-restriction valve at minimum opening).

The resulting dissipative control force, corresponding to a semi-active strategy, is written Usa.

In addition, since the natural characteristics of the system on opening of a given valve are quadratic (i.e. obey a square-law), the reference is shaped for low speeds (threshold speed Vo) in the form of a quadratic coupling (Cv $\dot{y}|\dot{y}|$) so as to remove any uncertainty concerning the control current to be applied to the valve at zero speed:

$$Fc=(1-q)Cv\dot{y}|\dot{y}|+q\text{Usa}, \quad q=\min(|\dot{y}|/Vo, 1)$$

A preferred embodiment of the hydraulic circuit of the semi-active damper of the invention is shown in FIG. 3.

In FIG. 3, P1 is the pressure in the chamber 5, P2 is the pressure in the camber 4, and P3 is the pressure in the accumulator 11.

CLd designates the expansion non-return valve and CLc designates the compression non-return valve, given respective references 8 and 7 in FIG. 1.

Vc and Vd designate the through orifices of a controlled-restriction valve 20, e.g. of the 4/2 proportional type (cf. FIG. 3) or else the through orifices of two 2/2 type valves (cf. valves 9 and 10 in FIG. 1).

An advantage of this scheme of the invention lies in the possibility of using a single valve with the two flow sections Vd and Vc being controlled in parallel, as shown in FIG. 3.

In the expansion stage (piston moving outwards), the expansion non-return valve CLd short circuits the orifice of the inactive valve Vc and allows the chamber 2 to be filled freely. The non-return valve CLc is closed. By controlling the through section of the active orifice of the valve Vd, it is possible to control the pressure in the chamber 1 and thus the force Fv exerted by the damper during expansion.

Operation in compression is symmetrical.

The force developed by the damper can be written in the form:

$$F = \underbrace{(P1 - P3)S1 - (P2 - P3)S2}_{Fv} - \underbrace{(P3 - Pe)St}_{Fpneum}$$

The force of interest is solely the dissipative hydraulic portion Fv.

By way of example, the way in which calculations are performed during the expansion stage is described below with reference to FIG. 3.

Headloss through the open non-return valve CLd is calculated as a function of the speed $\dot{y}$ and the control current applied to the controlled-restriction valve in application of a tabulated characteristic. This is a corrective term. The control current makes it possible to take account of the influence of the opening of the orifice Vc on the relationship for flow rate through the non-return valve.

$$\Delta P_{CLd} = P3 - P2 = G_{CLd}(\dot{y}, i_{th})$$

The headloss desired at the orifice of the active controlled-restriction valve Vd is calculated on the basis of the expression for Fc and $\Delta P_{CL}$:

$$\Delta P_v = P1 - P3 = (Fc - \Delta P_{CL} S2)/S1$$

$\Delta P_v$ is derived numerically and is then multiplied by the gain which is variable as a function of the speed $r(\dot{y})$ to determine the equivalent working speed:

$$\dot{y}_e = \dot{y} - r(\dot{y}) \frac{d\Delta P_v}{dt}$$

The control current is calculated to ensure the operating point:

$$\Delta P_v = fct(i_{th}, \dot{y}_e)$$

This characteristic has previously been identified in the form of tabulated non-linear gain $K(i_{th})$ as follows:

$$\Delta P_v = K(i_{th})|\dot{y}_e|\dot{y}_e$$

The principle of the inverse model consists in determining $i_{th}$ as follows: ftc3.8

$$i_{th} = K^{-1}\left(\frac{\Delta P_v}{|\dot{y}_e|\dot{y}_e}\right)$$

The description below relates to the direct control loop 19 and more particularly it relates to the inverse model 15 of the damper.

The element 15 shown in FIG. 4 provides the overall function of an inverse model.

This inverse model 15 of the damper serves to determine the ideal control current $i_{th}$ as a function of reference force Fc and of the measured speed $\dot{y}$.

It combines several blocks, and in particular:
a first block 15A for estimating the headloss $\Delta P_{CL}$ of the open non-return valve;
a second block 15B for estimating the headloss $\Delta P_v$ through the active controlled-restriction valve;
a third block 15C for calculating the ideal control current $i_{th}$ for the controlled-restriction valve;
a fourth block 15D for calculating the corrective term $\delta \dot{y}$ for the speed $\dot{y}$; and
a summing circuit 15E.

The internal circuit of the block 15 is based on a physical interpretation of the system. It shows up the various estimated physical magnitudes, namely:
the estimated headloss $\Delta P_{CL}$ through the open non-return valve:
in the expansion stage, this estimated headloss $\Delta P_{CL}$ is an estimate of P3–P2 for the expansion non-return valve 8;
in the compression stage, this estimated headloss $\Delta P_{CL}$ is an estimate of P3–P1 for the compression non-return valve 7;
the estimated headloss $\Delta P_v$ to be achieved by the active controlled-restriction valve situated between the chamber under pressure and the accumulator;
in the expansion stage, this headloss $\Delta P_v$ is an estimate of P1–P3 to be performed for the valve 10;
in the compression stage, this headloss $\Delta P_v$ is an estimate of P2–P3 to be performed for the valve 9; and
the computed equivalent speed $\dot{y}_e = \dot{y} + \delta\dot{y}$ based on the measured speed $\dot{y}$ and a corrective speed term $\delta\dot{y}$.

The description below relates to the detailed functions of the blocks making up the inverse model 15 of the damper.

The block 15A computes the headloss $\Delta P_{CL}$ through the open non-return valve, i.e.: the valve 8 in expansion and the valve 7 in compression.

The output magnitude $\Delta P_{CL}$ from the block 15A is interpolated from an array of characteristics tabulated as a function of the magnitudes input to said block 15A, i.e. $\dot{y}$ and $i_{th}$.

The block 15B estimates the headloss $\Delta P_v$ to be achieved by the active controlled-restriction valve placed between the chamber under pressure and the accumulator. The output $\Delta P_v$ from the block 15B is computed as a function of the two inputs to the block, i.e. Fc and $\Delta P_{CL}$:

$\Delta P_v = [Fc - \Delta P_{CL} S2]/S1$ in expansion (valve 10); and
$\Delta P_v = [Fc - \Delta P_{CL} S1]/S2$ in compression (valve 9).

In order to take the compressibility of the fluid into account, the measured speed information $\dot{y}$ is corrected by the output $\delta\dot{y}$ from the block 15D to form an equivalent speed $\dot{y}_e$ at the output from the summing circuit 15E $\dot{y}_e = \dot{y} + \delta\dot{y}$.

Block 15D computes the corrective speed term $\delta \dot{y}$ $$\delta\dot{y} = \epsilon(\dot{y})r(\dot{y})\frac{d\Delta P_v}{dt}$$

so $\dot{y}_e$ amounts to $$\dot{y}_e = \dot{y} + \epsilon(\dot{y})r(\dot{y})\frac{d\Delta P_v}{dt}$$

with $\epsilon(\dot{y}) = -1$ if $\dot{y} > 0$ (expansion) $= 1$ if $\dot{y} < 0$ (compression)
$r(\dot{y})$ is gain that is variable as a function of the speed $\dot{y}$ $$\frac{d\Delta P_v}{dt}$$

is the time derivative of $\Delta P_v$.

The block 15C computes the ideal control current $i_{th}$ as a function of the two inputs $\Delta P_v$ and $\dot{y}_e$ to the block 15C.

The through sections of the orifices Vc and Vd in the valves 9 and 10, respectively, have previously been characterized by identifying the non-linear gains K(i) relating headloss $\Delta P_v$ measured at the orifice under consideration, the measured equivalent speed $\dot{y}_{emeasured}$ constructed on the basis of the measured values for $\Delta P_{vmeasured}$ and $\dot{y}$, and the current i, in the form:

$$K(i) = \frac{\Delta P_{Vmeasured}}{|\dot{y}_{emeasured}|\dot{y}_{emeasured}}$$

In block 15C, use is made of this characterization to determine the current $i_{th}$ satisfying $$K(i_{th}) = \frac{\Delta P_v}{|\dot{y}_e|\dot{y}_e}$$

in which expression:
K(i) is the non-linear gain identified by the measurements;

$\Delta P_v$ is the headloss to be achieved, as computed at the output from block 15B; and $\dot{y}_e$ is the equivalent speed computed at the output of the summing circuit 15E.

The non-linear equation for the above unknown $i_{th}$ is reformulated as a minimization problem.

$i_{th}$ is computed as the current which minimizes the error function $\epsilon K(i)$ over the set of acceptable functions:

$$\epsilon K(i_{th}) = \min_i[\epsilon K(i)] = \min_i \left[ \left| K(i) - \frac{\Delta P_v}{|\dot{y}_e|\dot{y}_e} \right| \right]$$

We claim:

1. A semi-active damper controlled by a control circuit which includes a direct main control loop having an inverse model of the damper, said inverse model being based on physical magnitudes and being such as to enable a control magnitude to be determined as a function of a drive applied to the semi-active damper and of a predetermined reference force;

wherein said inverse model of the damper determines an ideal value for a control electric current $i_{th}$ for controlling a compression controlled-restriction valve and an expansion controlled-restriction valve on the basis of a measured value of relative speed $\dot{y}$ between two ends of the dampers, a force reference value Fc, and an equivalent speed $\dot{y}_e$ deduced from said relative speed $\dot{y}$.

2. A semi-active damper controlled by a control circuit which includes a direct main control loop having an inverse model of the damper, said inverse model being based on physical magnitudes and being such as to enable a control magnitude to be determined as a function of a drive applied to the semi-active damper and of a predetermined reference force Fc;

wherein said inverse model of the damper comprises:
a first estimator for estimating the headloss $\Delta P_{CL}$ of an open non-return valve of the damper, wherein said open non-return valve is an expansion non-return valve when the damper is in expansion and said open non-return valve is a compression non-return valve when the damper is in compression;

a second estimator for estimating the headloss $\Delta P_v$ of an active controlled-restriction valve of the damper;

a circuit for computing an ideal control current $i_{th}$ for one or more controlled-restriction valves of the damper;

a circuit for computing a corrective speed term $\delta \dot{y}$ for correcting a measured speed signal $\dot{y}$ which corresponds to motion of the damper; and a summing circuit providing an equivalent speed signal $\dot{y}$ to said circuit for computing an ideal control current.

3. The damper according to claim 2, in which said headloss $\Delta P_{CL}$ estimated by said first estimator is interpolated from an array of characteristics tabulated as a function of $\dot{y}$ and $i_{th}$ which are both input to said first estimator.

4. The damper according to claim 2, in which said second estimator estimates the headloss $\Delta P_v$ to be achieved by the active controlled-restriction valve, which is disposed between a chamber under pressure and an accumulator of the damper.

5. The damper according to claim 4, in which the headloss $\Delta P_v$ estimated by said second estimator is computed as a function of Fc and $\Delta P_{CL}$, which are both input to said second estimator, according to the expression:

$\Delta P_v = [Fc - \Delta P_{CL} S2]/S1$ when the damper is in expansion, and $\Delta P_v = [-Fc - \Delta P_{CL} S1]/S2$ when the damper is in compressions;

wherein S1 is a surface area of a first side of a piston of the damper, and S2 is a surface area of a second side of said piston, said first side being a side of said piston which is subject to fluid pressure and which does not have a piston rod, and said second side being a side of said piston which subject to fluid pressure and which has a piston rod.

6. The damper according to claim 4, in which the measured speed signal $\dot{y}$ is corrected by the corrective speed term $\delta \dot{y}$ via said summing circuit, so that said equivalent speed $\dot{y}_e$ is provided according to the expression:

$$\dot{y}_e = \dot{y} + \delta \dot{y}.$$

7. The damper according to claim 2, in which said corrective speed term $\delta \dot{y}$ is given by the expression:

$$\delta \dot{y} = \epsilon(\dot{y}) r(\dot{y}) \frac{d\Delta P_v}{dt}$$

8. The damper according to claims 2, wherein the ideal control current $i_{th}$ is computed as a function of $\Delta P_v$ and $\dot{y}_e$.

9. The damper according to claim 8, wherein the ideal control current $i_{th}$ is determined to be a control current which satisfies the function $\epsilon K(i_{th})$, which function is arrived at by minimizing an error function $eK(i)$ over a set of acceptable control currents for said one or more controlled-restriction valves, $\epsilon K(i_{th})$ being determined according to the expression:

$$\epsilon K(i_{th}) = \min_i[eK(i)] = \min_i \left[ \left| K(i) - \frac{\Delta P_v}{|\dot{y}_e|\dot{y}_e} \right| \right]$$

in which expression:

$K(i)$ is a non-linear gain function of $i$, which is determined from empirical measurements; and $i$ is a member of the set of acceptable control currents.

10. The damper according to claim 2, in which a secondary force feedback loop introduces a minor corrective term $\delta i$ into said ideal control current $i_{th}$ produced by said direct main control loop, wherein the minor corrective term $\delta i$ is a term which is based on a force error $\epsilon F$ between the reference force Fc and a measured value of force F which is exerted by said damper.

11. The damper according to claim 9, wherein the non-linear gain function $K(i)$ has been empirically determined, so as to characterize the controlled-restriction valves, according to the expression:

$$K(i) = \frac{\Delta P_{Vmeasured}}{|\dot{y}_{emeasured}|\dot{y}_{emeasured}}$$

wherein $\Delta P_{vmeasured}$ is a measured value of headloss of the controlled-restriction valves at a corresponding value of $i$, and $\dot{y}_{emeasured}$ is a measured value of equivalent speed of motion of the damper at a corresponding value of $i$.

12. A semi-active damper controlled by a control circuit which includes a direct main control loon having an inverse model of the damper, said inverse model being based on physical magnitudes and being such as to enable a control magnitude to be determined as a function of a drive applied to the semi-active damper and of a predetermined reference force; wherein the reference force is given by the expression:

$Fc=(1-q)Cv\dot{y}|\dot{y}|+q\ Usa$, where $q=\min(|\dot{y}|/Vo, 1)$; and wherein Cv is a transfer function gain, Usa is a dissipative control force, and Vo is a threshold speed.

13. A semi-active damper controlled by a control circuit which includes a direct main control loop having an inverse model of the damper, said inverse model being based on physical magnitudes and being such as to enable a control magnitude to be determined as a function of a drive applied to the semi-active damper and of a predetermined reference force;

wherein said inverse model of the damper determines an ideal value for a control electric current $i_{th}$ for controlling a single compression controlled-restriction and expansion controlled-restriction valve, on the basis of a measured value of relative speed $\dot{y}$ between two ends of the damper, a force reference value Fc, and an equivalent speed $\dot{y}_e$ deduced from said relative speed $\dot{y}$.

* * * * *